(12) United States Patent
Ullmann et al.

(10) Patent No.: US 7,103,634 B1
(45) Date of Patent: Sep. 5, 2006

(54) METHOD AND SYSTEM FOR E-MAIL CHAIN GROUP

(75) Inventors: Lorin Evan Ullmann, Austin, TX (US); Joseph Kubik, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1021 days.

(21) Appl. No.: 09/714,759

(22) Filed: Nov. 16, 2000

(51) Int. Cl.
*G06F 15/16* (2006.01)

(52) U.S. Cl. .................. 709/206; 709/204; 709/245

(58) Field of Classification Search ............... 709/206, 709/246, 217, 220, 204, 245; 395/200, 345; 345/704
See application file for complete search history.

(56) References Cited

U.S. PATENT DOCUMENTS

| | | | |
|---|---|---|---|
| 5,125,075 A | 6/1992 | Goodale et al. ............. 395/200 |
| 5,659,746 A | 8/1997 | Bankert et al. ............. 395/621 |
| 5,765,033 A | 6/1998 | Miloslavsky ........... 395/200.36 |
| 5,767,847 A | 6/1998 | Mori et al. ................. 345/329 |
| 5,905,863 A * | 5/1999 | Knowles et al. ............ 709/206 |
| 6,185,551 B1 * | 2/2001 | Birrell et al. .................. 707/3 |
| 6,321,267 B1 * | 11/2001 | Donaldson .................. 709/229 |
| 6,346,952 B1 * | 2/2002 | Shtivelman ................. 345/758 |
| 6,421,709 B1 * | 7/2002 | McCormick et al. ....... 709/206 |
| 6,480,885 B1 * | 11/2002 | Olivier ........................ 709/207 |
| 6,496,853 B1 * | 12/2002 | Klein ......................... 709/206 |
| 6,772,216 B1 * | 8/2004 | Ankireddipally et al. ... 709/230 |
| 6,823,368 B1 * | 11/2004 | Ullmann et al. ............ 709/206 |

OTHER PUBLICATIONS

Conversion-Based Mail by Douglas E. Comer and Larry L. Peterson, Nov. 1986, ACM Transactions.*

* cited by examiner

*Primary Examiner*—John Follansbee
*Assistant Examiner*—M. A. Siddiqi
(74) *Attorney, Agent, or Firm*—Robert H. Frantz; David A. Mims, Jr.

(57) ABSTRACT

An enhanced e-mail reader and composer having automatic addressing functions to create and manage chain groups for organizing chain-forwarded and chain-replied messages. The system and method allows users to receive chained messages, automatically create chain groups within their address book, associate chain message participants to chain groups, and to automatically address new messages to members of chain groups stored within their address book.

15 Claims, 5 Drawing Sheets

*Prior Art*

METHOD AND SYSTEM FOR E-MAIL CHAIN GROUP

CROSS-REFERENCE TO RELATED APPLICATIONS (CLAIMING BENEFIT UNDER 35 U.S.C. 120)

This application is related to the U.S. application Ser. No. 09/672,181 filed on Sep. 28, 2000 by Lorin Evan Ullmann, et al, which is commonly assigned.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

The related application, Ser. No. 09/672,181, filed by Lorin Evan Ullmann, et al, on Sep. 28, 2000, is incorporated herein by reference in its entirety, including drawings, and hereby is made a part of this application.

BACKGROUND OF THE INVENTION

1. Field of the Invention

This invention pertains to the arts of electronic message and e-mail transmission and reception, and especially to the arts of automatic address generation for e-mail composers and readers for managing groups of e-mail authors and receivers for chain-forwarded messages.

2. Description of the Related Art

Electronic mail and electronic messaging have become key and integral to everyday life, both in personal lives and business lives, for millions of users worldwide. The speed and accuracy with which electronic messages and e-mails are delivered is unrivaled by other forms of messaging, such as paper mail, overnight express mail, facsimile, and voice messaging.

Prior to the widespread proliferation of the Internet and Internet-based e-mail, there were many proprietary formats of electronic messaging systems, such as IBM's Lotus Notes system, Novel's DaVinci system, and others.

However, due to global acceptance and adoption of the Internet, the Internet's e-mail protocol has become the most common electronic messaging protocol in use today. The Simple Mail Transfer Protocol ("SMTP") provides for a quick, error-free and robust method for transferring electronic messages from one e-mail server to another. SMTP is primarily based upon two standards proliferated by the Internet Architecture Board ("IAB"), specifically RFC-821 "Simple Mail Transfer Protocol" and RFC-822 "Standard for the format of ARPA Internet text messages". These standards and protocols are well-known in the art. RFC-821 describes the protocol used for transferring electronic messages from one server to another, and RFC-822 describes a corresponding format for those electronic messages.

Figure 1:
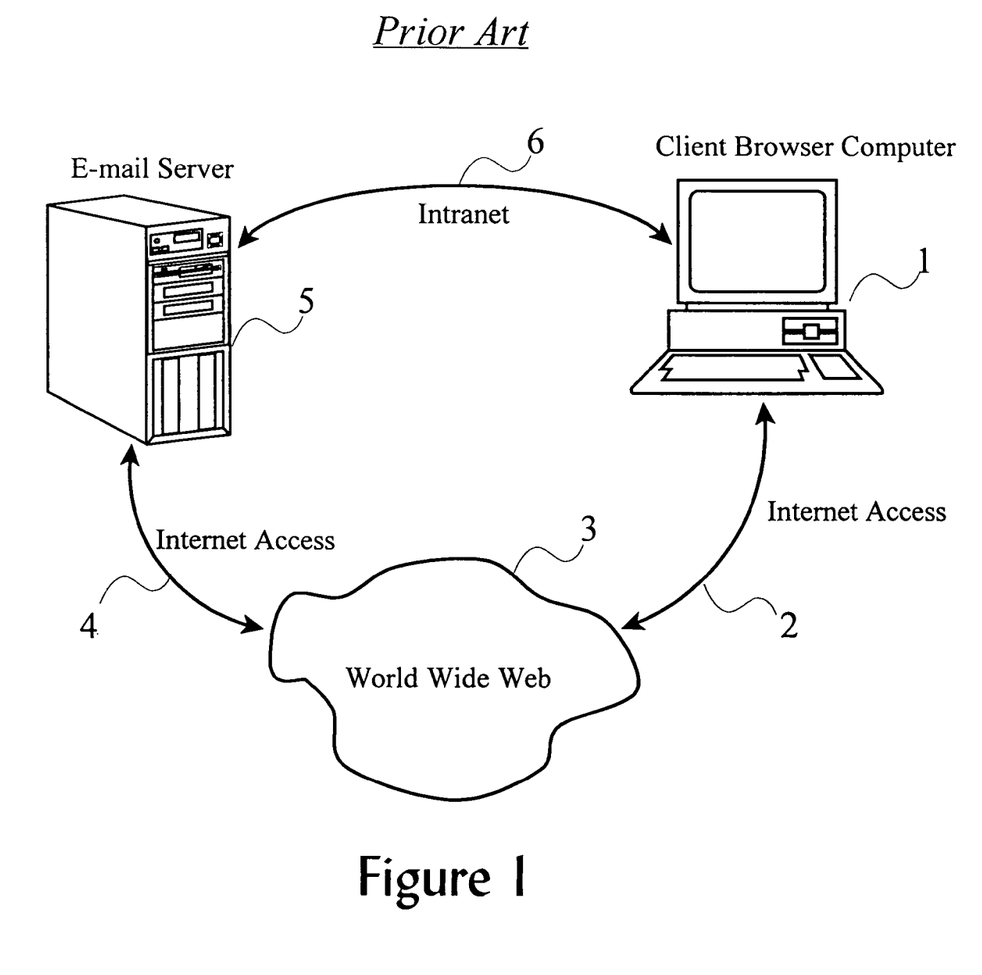
FIG. 1 shows the common arrangement of e-mail servers, client computers, and computer networks.

Turning to FIG. 1, the basic arrangement of client browser computer or client e-mail computers and web servers is shown. A client computer (1) may access a web-based e-mail server (5) via any computer network, such as the World Wide Web (3), or an Intranet (6) such as a LAN or WAN. This access may be made through a modem and a dial-up Internet Service Provider ("ISP"), or through a "dedicated" direct connection to the Internet. The client computer (1) is normally equipped with an e-mail composer and reader program, such as Quailcomm's Eudora, Netscape's Messenger, or Microsoft's Outlook programs. These and many other widely available programs are compliant with the SMTP standards, and interoperate with e-mail servers over computer networks such as the World Wide Web.

Figure 2:
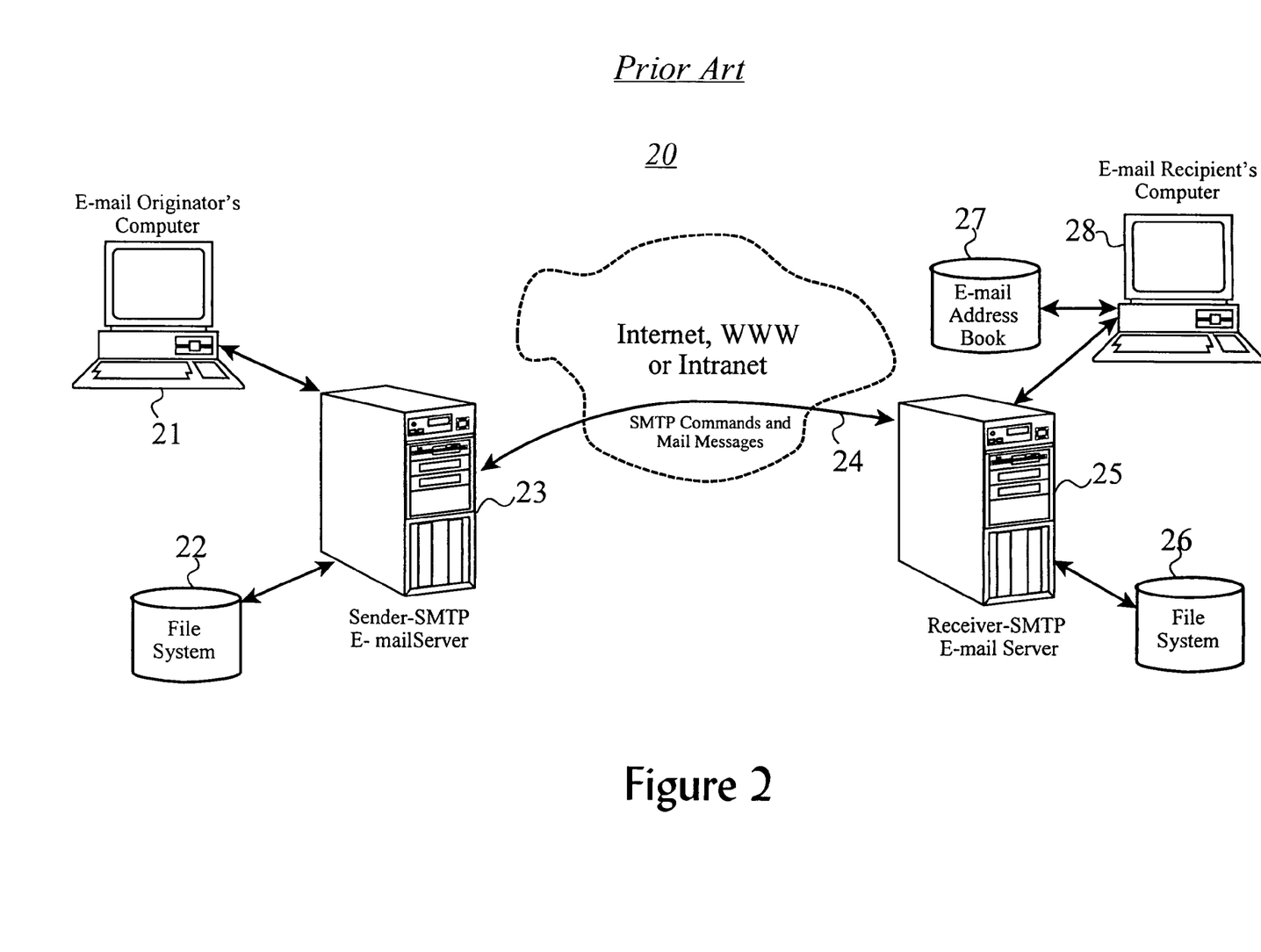
FIG. 2 shows the fundamental arrangement of e-mail sender and receiver servers.

Turning to FIG. 2, the arrangement (20) as defined by the RFC's of a sender server (23) and a receiver server (25) using the SMTP protocol is shown. A user (21) may author a SMTP-compliant message and send that message to an e-mail sender server (23). Using a series of SMTP commands (24) which are communicated to a receiver SMTP server (25) via a computer network, the electronic message is transferred from the sender SMTP (23) to the receiver SMTP server (25).

The receiver SMTP (25) server typically stores the received electronic message within its file system (26) for later retrieval by the intended recipient. The addressing and routing scheme used by e-mail servers to transmit and route electronic messages to each other using of this protocol are well-known within the art, and are also defined in the public RFC documents of the IAB.

Eventually, the recipient uses his computer (28) to download the messages from the receiver server (25), and to read, reply, or forward the messages. His computer (28) is usually equipped with e-mail reading and authoring software, which may include an e-mail address book (27).

The generalized message format of an electronic message is shown in Table 1. An electronic message is typically divided into two portions, a header and a body. Within the header are multiple tags or fields which indicate the source and destination of the message and other useful information.

TABLE 1

Generalized Electronic Message Format

```
Received: from source by local_server; time_of_day
From: senders_name <senders_email_address>
Reply-to: <senders_email_address>
To: recipients_name <recipients_email_address>
Subject: text_of_the_subject_line
Content-type: type_of_content_such_as_MIME
Text of the actual message
```

In the example generalized message format shown in Table 1, there is a "Received" header field, a "From" header field, a "Reply-To" field, and a "To" field. These are also followed by a "Subject" field and then finally by the text of the actual message. These fields are generated by the e-mail composer on the originator's computer, and they are used by the various e-mail servers within the computer network to route the messages to the correct recipient.

As shown in Table 1, the "Received:" message header field shows information regarding which server received the message and at what time of day it was received by the local server. The "From" field in the message header shows the originator's or the sender's name and address. The "Reply-To" field shows the sender's e-mail address for use in replying to the sender. The "To" field shows the intended recipient's name and/or recipient's e-mail address. And, the "Subject" field shows a text string to be displayed when the e-mail is viewed among other e-mails in a mail box.

Most e-mail composer and reader programs allow messages to be forwarded to second, third, and subsequent recipients. For example, a sender may author an original message and send it to a first recipient. The first recipient may read that message, append comments to it and forward it to a second recipient. Table 2 shows a generalized message format for forwarded electronic messages which uses using a method of forwarding called "inline content".

TABLE 2

Generalized Forwarded Electronic Message Format
using Inline Type of Forwarding

Received: from source by local_server; time_of_day
From: first_recipients_name <first_recipients_email_address>
Reply-to: <first_recipients_email_address>
To: second_recipients_name <second_recipients_email_address>
Subject: FWD:text_of_the_subject_line_written_by_the_originator
Content-type: type_of_content_such_as_MIME
Content-disposition: inline
Text of the message written by the first recipient intended for the second recipient
Boundary_tag
Received: from source by local_server; time_of_day
From: originator_name <originators_email_address>
Reply-to: <originators_email_address>
To: first_recipients_name <first recipients_email_address>
Subject: FWD:text_of_the_subject_line_written_by_the_originator
Content-type: type_of_content_such_as_MIME
Text of the actual message written by the originator and intended for the first recipient
Boundary_tag This forwarded message format resembles the generalized message format of Table 1, especially in the initial message header, including the "received" field, "from", "reply-to", "to", and "subject" fields. However, most programs modify the text contained in the "subject" field to include an indication that this is a forwarded message, such as appending the letters "FWD" prior to the actual text of the originator's subject line. Following this message header, the text of the comments authored by the first recipient and intended for the second recipient are given. Then, according to the inline forwarding method, a boundary tag is given which indicates the beginning of the actual forwarded message. Following the first boundary tag, another set of message header fields are shown which are the message header fields from the original message from the original sender of the message. These message fields are then followed by the text of the original message from the originator, and is concluded by a closing boundary tag.

Another method for forwarding an electronic message to another recipient is by "attaching" the original message to the new message. The SMTP protocol allows for files of all types to be "attached" to an electronic message, and as such, one method for forwarding a message is to create a new message to the next recipient, and to attach the old message to this new message.

As shown in Table 3, the general format of a forwarded message as an attachment is seen.

TABLE 3

Generalized Forwarded Electronic Message Format
using Attachment Type of Forwarding Received: from source by local_server; time_of_day
From: first_recipients_name <first_recipients_email_address>
Reply-to: <first_recipients_email_address>
To: second_recipients_name <second_recipients_email_address>
Subject: FWD:text_of_the_subject_line_written_by_the_originator
Content-type: type_of_content_such_as_MIME
Content-disposition: inline TABLE 3-continued Generalized Forwarded Electronic Message Format
using Attachment Type of Forwarding Text of the message written by the first recipient intended for the second recipient
Start-of-attachment-tag
   Received: from source by local_server; time_of_day
   From: originator_name <originators_email_address>
   Reply-to: <originators_email_address>
   To: first_recipients_name <first_recipients_email_address>
   Subject:
   FWD:text_of_the_subject_line_written_by_the_originator
   Content-type: type_of_content_such_as_MIME
   Text of the actual message written by the originator and intended for the first recipient
End-of-attachment-tag This message begins similar to the message in Table 2 in that it is preceded by a new message header containing multiple header fields, including the "received", "from", "reply-to ", "to", "subject" fields. However, in this case following the text of the comments written by the first recipient for the second recipient, there are special tags to indicate that there is attached file rather than the inline copy of the forwarded file. This may be the same type of tag that may be used to attach a data file or other type of file to the electronic message, but in this case the attached file is simply a text file which is actually the original message from the originator.

Thus, if one looks within that attached file, one will see that there is the original set of message header tags which indicate the originator's name, the first recipient's name (or the previous recipient's name) and other useful information regarding the previous message.

A subsequent recipient may choose to forward the message to another recipient, thereby forming a chain-forwarded message which may have the original message forwarded through a combination of methods.

All of these message header fields are used for various functions of the e-mail reader and e-mail composer software. If a user wants to reply to the sender of a message he may simply click or select a "reply" function in response to which the composer will be invoked and will automatically address the message to the address indicated in the "reply-to" field of the message. Also, the user may forward the message quite simply by clicking a "forward" button (or otherwise invoking a forward function), which causes the composer to allow creation of a new messaging containing or attaching the first message, and giving the user the capability to enter the next recipient's address and any comments he or she wishes to include.

Another useful function of common e-mail composers and readers available in the art today is that of an address book. An address book stores names and e-mail addresses of other users who are commonly communicate with the user. Most e-mail composers and readers also include automatic functions for adding a message sender's address and information to an address book.

However, with the inline and attachment methods of forwarding electronic messages, addresses for the previous recipient's and the originator of forwarded messages cannot be easily or automatically added to the address book, other than that of the most immediate previous recipient. Further, they cannot be automatically responded to or forwarded to as they are not currently indicated in the first group of message header fields of the forwarded message.

Thus, a user must resort to attempting to type manually each of the previous recipient's e-mail addresses, if he knows them. For example, if a message is forwarded five times from an originator, the fifth recipient can automatically reply to the fourth recipient using the available automatic functions of current e-mail composers, however, he cannot easily reply to all four previous recipients and originator without manually retyping the addresses of each of those parties. Further, he cannot easily add any of these previous recipients and the originator to his address book, except for the fourth recipient.

A third method of forwarding e-mail messages is by "quoting" the actual message into the text of the new message intended for the next recipient. In this method, none of the previous header fields are forwarded to the next recipient. A simple line of text such as "Previous_recipient wrote:" may be inserted above the quoted text, and the quoted text may be set apart such as using a character such as ">" or a blue bar in the left margin.

In this case, it is much more difficult for the recipient of a chain-forwarded message to reply to previous recipients because the information regarding the previous recipient's addresses has been completely stripped from the forwarded message.

The related application disclosed a system and method for automatically determining the previous authors and recipients of chain-forwarded electronic messages. In the related application, a method was described in which the received electronic message is scanned or parsed for existing SMTP fields and for new unique fields which indicate a chain of e-mail addresses to which and from which a chain forwarded message may be have been received or sent. The disclosed method and system also provides a method for easily adding these recipients and authors to a user's electronic mail address book.

As these types of messages are forwarded several times or replied to several times, the method used employed by common SMTP e-mail software programs to display multiple replies and comments may be somewhat confusing. For example, Table 4 shows one method that common e-mail software uses to display the forwarded text components of a chain-forwarded electronic message. In this example a right arrow or greater than symbol ">" is used to indicate how many previous instances of forwarding or replying levels have occurred for a given portion of the message.

TABLE 4

Example Display of Linearly Chain-forwarded E-Mail Message

From: first_recipients_name <first_recipients email_address>
To: second recipients_name <second_recipients email_address>
Subject: FWD:text_of_the_subject line_written_by_the_originator
Here is something I thought you might find interesting from a friend of mine.
>From: originator_name <originators_email_address>
>To: first_recipients_name <first_recipients_email_address>
>Subject: FWD:text_of_the_subject_line_written_by_the_originator
>What do you think of this new information?
>>From: update@online_news_service.com
>>To: originator_name <originators_email_address>
>>Subject: FWD:text_of_the_subject_line_written by_the_originator
>>Shares of company ABC hit all-time high after news of new product
>>release. Company ABC announced that its new XYZ product would
>>ship by the end of the year, and would be 5 times more efficient that
>>the closest competitor product.

As can be seen from the example given in Table 4, each time a portion of a text message is forwarded to a new recipient, an additional forwarding character is added along the left margin of the text. This example illustrates a simple linear forwarding scheme in which an automatic news service forwarded news to an originator of a message. The originator then forwarded that message to a first recipient, who then forwarded the same message to a second recipient, such that each time the message was forwarded, the current recipient added a comment of his own.

As shown in Table 5, a chain replied and chain forwarded message may become confusing to read in this format, especially if the progression of the messages and replies is not a linear progression. For example, if the message is forwarded to more than one party simultaneously, and then it is replied to by more than one party, it may become difficult to determine at what time certain replies were made and how each reply relates to the original message or messages. Even though this is a very common message format to receive in today's paradigm of electronic messaging, it is very difficult to decipher and interpret by a recipient.

TABLE 5

Example Display of Non-linearly
Chain-forwarded E-Mail Message

From: bob
To: joe
Subject: REPLY: news about ABC's XYZ
I'm not sure I understand who their competitors really are?
>From: sue
>To: joe
>Subject: FWD: REPLY: ABC's XYZ is now available
>Joe, that ought to take all the market share from ABC's biggest
>competitor!!
>I can't wait to see how this plays out.
>>From: joe
>>To: sue, bob
>>Subject: REPLY: FWD:ABC shares up sharply on new product
>>announcement
>>Shares of company ABC hit all-time high after news of new product
>>release. Company ABC announced that it's new XYZ product would
>>ship by the end of the year, and would be 5 times more efficient that
>>the closest competitor product.
>>>From: sue
>>>To: joe
>>>Subject: lunch conversation
>>>Joe,
>>>I was having lunch with Bob yesterday, and he said you had told him
>>>that you were getting ready to buy a lot of shares in ABC company. Is
>>>that right? I heard that their competitors had captured nearly 100% of
>>>the market share last year and ABC company might not survive
>>>the year.
>>>Bye, Sue As shown in Table 5, it becomes indeterminate as to the order and relevance of forwarded text components and replied text components within a chain-forwarded message, especially if it was not linearly forwarded or replied to, as in this example.

Another form of communications based on text transmissions is known as "chat groups." In chat groups, a single window or a pair of windows is displayed in which replies are posted with a simple label or text identifier as to the submitter or creator of the reply. The label may be a simple as a nick name, first name, or login name, but is not usually as long or as complex as a full e-mail address. For example, Table 6 shows a similar conversation held in a chat group.

TABLE 6

Example Discussion in a Chat Group

| | |
|---|---|
| bob: | I'm not sure I understand who their competitors really are? |
| sue: | Joe, that ought to take all the market share from ABC's biggest competitor!! I can't wait to see how this plays out. |
| joe: | Sue, I heard that shares of company ABC hit all-time high after news of new product release. Company ABC announced that it's new XYZ product would ship by the end of the year, and would be 5 times more efficient that the closest competitor product. |
| sue: | Joe, I was having lunch with Bob yesterday, and he said you had told him that you were getting ready to buy a lot of shares in ABC company. Is that right? I heard that their competitors had captured nearly 100% of the market share last year and ABC company might not survive the year. |

As shown in Table 6, a participant such as Bob can monitor the entire thread of conversation between Sue and Joe until he has a question or comment to add. A chat group viewer presents the conversation in a linear format even though it may occur or be originated by multiple parties asynchronously. Further, a chat group such as this is typically organized by participant profile, such as "young adults" or "music lovers," or by subject such as "politics" or "health.". From a chat room server, a user may select a particular subject or participant profile in order to join a chat. Some chat room servers allow a participant to print the interactions as they occur, but in general the chats occur on a realtime basis, unlike electronic mail messaging.

Therefore, there is a need in the art for a system and method which allows convenient and efficient management of chain forwarded and chain replied electronic mail messages. Further, there is a need in the art for this system and method to provide quick and easy association of sender and receiver electronic message addresses to groups of chain forwarded and chain replied electronic messages.

BRIEF DESCRIPTION OF THE DRAWINGS

The following detailed description, when taken in conjunction with the figures presented herein, provides a complete description of the invention.

SUMMARY OF THE INVENTION

A system and method for creating and managing chain groups for chain forwarded and chain replied electronic messages which allows users to receive chained messages, automatically create chain groups within their address book, to associate chain message participants to chain groups, and to automatically address new messages to members of chain groups stored within their address book.

DETAILED DESCRIPTION OF THE INVENTION

The method and system of the invention are preferably realized as software extensions, plug-ins, or applets associated with a standard electronic mail composer and reader program. This enhanced electronic composer and reader program is then executed by a standard client computer platform such as an IBM personal computer ("PC"), Apple Macintosh or iMAC, or similar computer.

Figure 3:
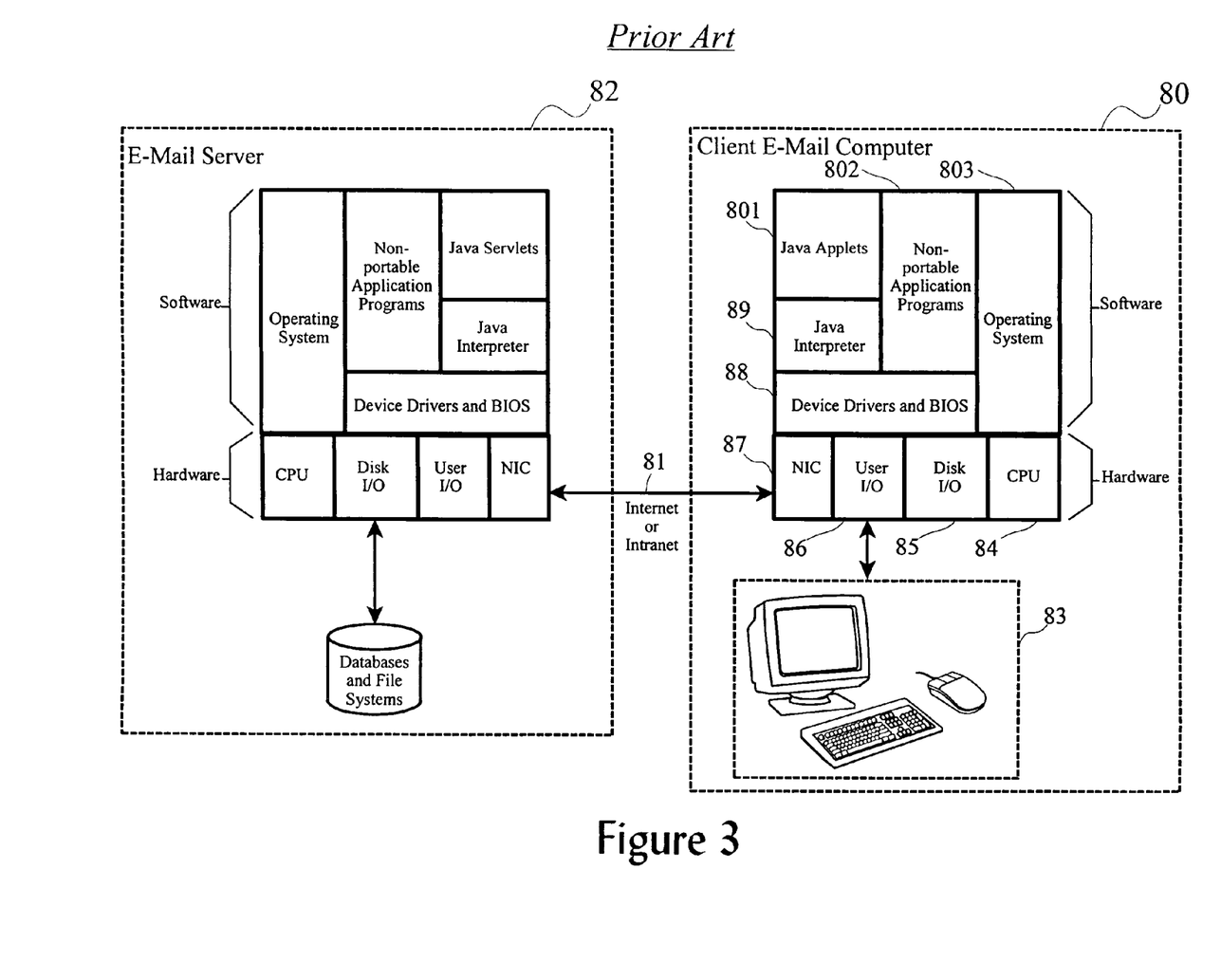
FIG. 3 depicts the basic architecture of e-mail servers and a client computers.

As shown in FIG. 3, the preferred embodiment includes a client computer (80) which has a central processing unit (84), disc input and output (85) for communicating for floppy disks, hard drives, and CD ROM's, user IO device interfaces (86) such as a display, keyboard, and mouse (83), and a network interface card (87) for interfacing to a computer network such as the Internet or an Intranet (81). The preferred embodiment of the client computer includes device drivers and a bios (88), an operating system such as the Microsoft Windows operating system or IBM OS/2 operating system. The computer platform (80) further comprises non-portable application programs (802) such as the e-mail composer and reader program. The preferred embodiment of the client computer (80) also includes a Java interpreter (89) capable of executing Java applets (801). The e-mail composer and reader such as Netscapes' Messenger program is installed as a non-portable application program (82). The method of the invention may be implemented as changes within the e-mail composer and reader program or as a plug-in modules such as a Netscape Plug-in. Alternatively, it may be implemented as an applet such as a Java applet. The methods for extending such program code, developing a browser plug-in, or an applet is well understood in the art.

Receiving Chain Group Messages and Managing Chain Groups in the Address Book

The enhanced e-mail reader as described in detail in the related patent application is compatible with the two modes of prior art forwarding of electronic messages, namely, the methods of inlining and attaching the forwarded message. However, as a quoted forwarded message does not include any of the message header fields from the previous recipients, the enhanced e-mail reader of the related patent application may also find a special message header field indicating the chain-recipients of a quoted chain-forwarded message.

When the user invokes the electronic message authoring function of the enhanced e-mail composer of this related invention and indicates that he wants to forward a previously received message, he is provided the normal opportunity to append comments for the next recipient. Then, a special field containing the list of previous recipients, which may be generated by scanning the attached or inlined header fields of the original message, is created and added to the new forwarded message.

One embodiment of this special field is shown in Table 7 as the "Sender-Chain" field, which includes a list of previous recipients and/or the originator's name and address. This field may be ignored by other older or non-enhanced versions of e-mail readers, but may be detected and used by enhanced e-mail readers. If no message fields are detected for the previous recipients, then the message is sent to the next recipient using a normal unmodified forwarding message.

TABLE 7

Enhanced Forwarded Electronic Message Format
using New Header Field for Sender-Chain Received: from source by local_server, time_of_day
From: first_recipients_name <first_recipients_email_address>
Reply-to: <first_recipients_email_address>
To: second_recipients_name <second_recipients_email_address>
Subject: FWD:text_of_the_subject_line_written_by_the_originator
Content-type: type_of_content_such_as_MIME
Content-disposition: inline/attachment
Sender-Chain: originaor_name <originators_email_address>;
    first_recipients_name <first_recipients_email_address>
Text of the message written by the first recipient intended for the second
    recipient
Boundary tags bracketing inline forwarded message(s) or attachment tags
    bracketing attached message(s)

Alternatively, the "Reply-To field" in the forwarded message header may be appended to include a list of previous recipients such that the user may simply click or select "Reply to All" function of the e-mail composer to invoke the full list of previous recipients, as shown in Table 8.

TABLE 8

Enhanced Forwarded Electronic Message Format using Multiple
Sources in Message Header "Reply-To" Field for Sender-Chain Received: from source by local_server; time_of_day
From: first_recipients_name <first_recipients_email_address>
Reply-to: <first_recipients_email_address>; originator_name
    <originators_email_address>;
To: second_recipients_name <second_recipients_email_address>
Subject: FWD:text_of_the_subject_line_written_by_the_originator
Content-type: type_of_content_such_as_MIME
Content-disposition: inline/attachment
Text of the message written by the first recipient intended for the second
    recipient
Boundary tags bracketing inline forwarded message(s) or attachment tags
    bracketing attached message(s)

Figure 4:
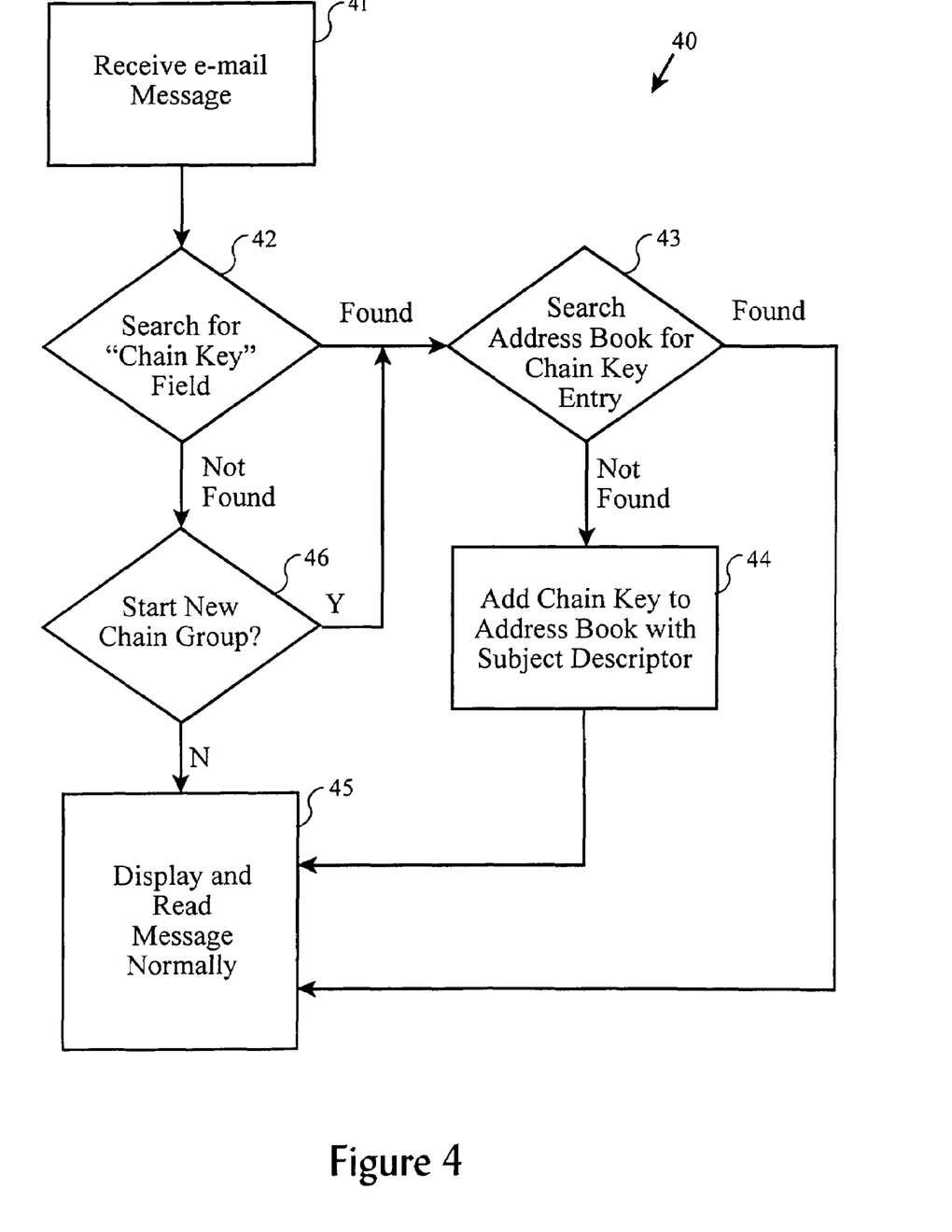
FIG. 4 shows the logical process of the invention for receiving and reading a chain-forwarded e-mail message, and for creating and managing chain groups.

The logical process (40) of the present invention for receiving a chain-forwarded message and for managing that message related to a chain group is shown. First, an e-mail message is received (41) and that message is searched (42) for another additional field in addition to the standard header fields (e.g. in addition to the TO, FROM, etc. fields), which we refer to as a CHAIN_KEY field.

If a CHAIN_KEY field is found, then a search (43) is made in the user's address book for a corresponding CHAIN_KEY entry. If no existing corresponding CHAIN_KEY entry is found in the address book, the user is allowed to add and define (44) a new chain group in the address book along with a subject descriptor. The new user-defined chain group and subject descriptor are added (44) to the user's address book associated with the found CHAIN_KEY field value. The message is then displayed and read (45) otherwise normally.

Additional entries in the address book may be made at the time of creating the new chain key and subject descriptor by entering any found recipients and originators of the message into the address book, thereby automatically associating those originators and recipients (and their e-mail addresses) with the new chain key. This defines a new chain group, including group members (associated originators and recipients with addresses), an existing chain key, and a chain group subject descriptor.

The method for searching the message to find previous recipients and originators of the chain-forwarded message was described in the related application.

If the search (42) of the received message is searched for a CHAIN_KEY field does not result in a found CHAIN_KEY field, then the user is allowed (46) to create a new chain group definition, including a new chain key value. If the user so desires, the address book is searched (43) to determine if his selection is an existing chain key entry in the address book. If it is not, then a new chain key value is defined (44), along with a new subject descriptor and new chain group members, as described previously.

However, if the user simply wants to add this message to an existing chain group, the address book search (43) for the selected chain key value or the selected subject descriptor will result in a found chain key entry in the address book, and will result in normal displaying and reading of the message (45).

Authoring New Messages for Chain Groups

Figure 5:
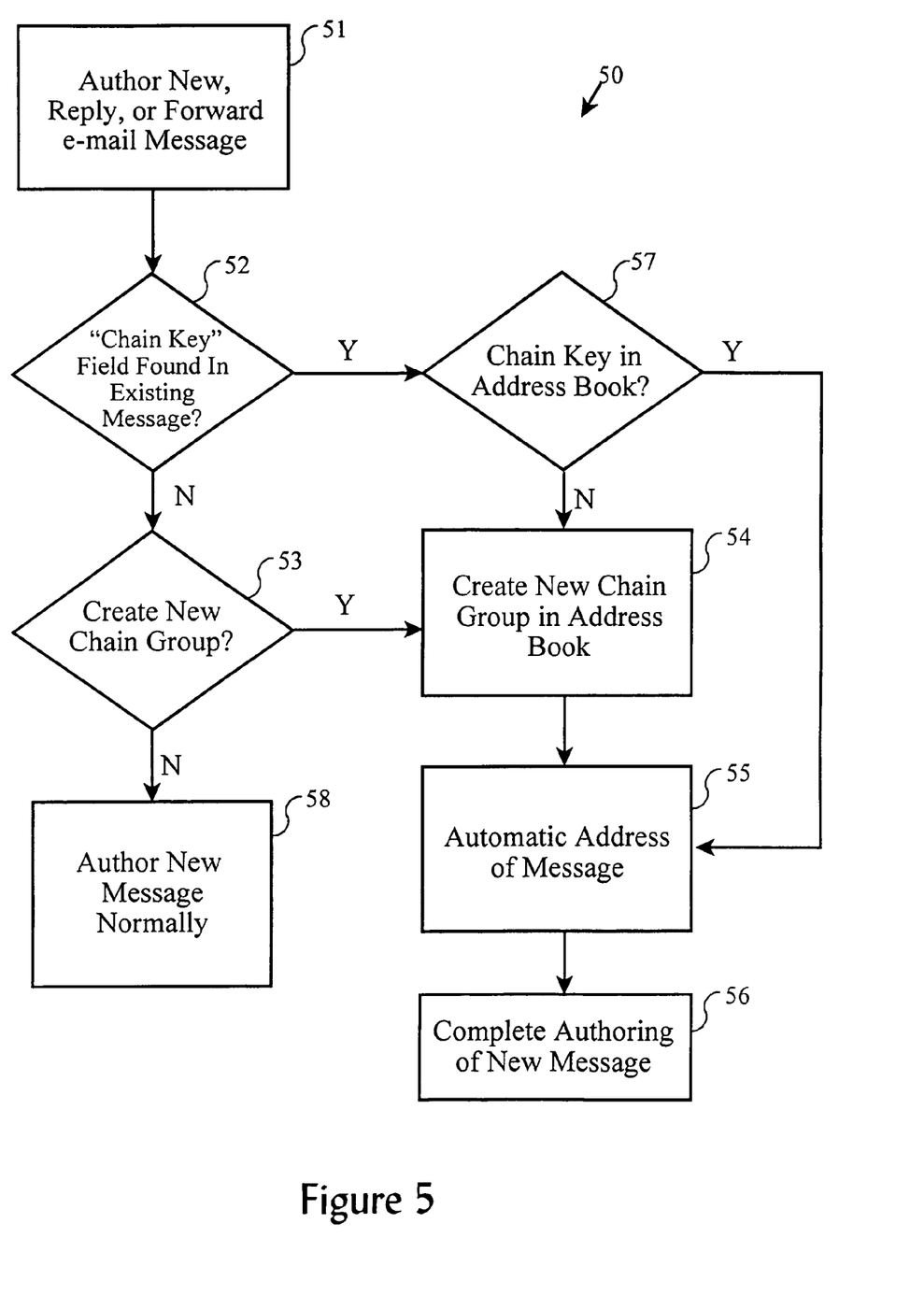
FIG. 5 shows the logical process of the invention for authoring new, forwarded or reply e-mail messages for chain groups.

Turning to FIG. 5, the logical process (50) of authoring a new message, a reply message, or a forwarded message based upon a received electronic mail message is shown. When the user of the e-mail software or system elects to create a new e-mail message or to reply or forward an e-mail message (51), the message is searched (52) to examine and find any existing CHAIN_KEY fields that may exist in the previous message.

If no CHAIN_KEY fields are found in the previous message, the user prompted (53) to create a new chain group. If he elects to create a new chain group, the group is created (54) in the address book, along with a subject descriptor according to the preferred embodiment. He may also associate one or more of the found previous recipients and originators (and their e-mail addresses) with the chain group in the address book (54).

Then, the new message may be automatically addressed (55) to one or more of the members of the newly-defined chain group in the address book by retrieving and selecting the member entries associated with the chain group and chain key. Normal authoring of the new message is completed (56) next.

If a CHAIN_KEY field is found (52) in the previous message, the address book is searched (57) to determine if that chain key is contained in the address book. If it is not contained in the address book, the user is allowed to create (54) a new chain group with a chain group subject descriptor and chain key value, and to associate any previous recipients and originators of the previous message in his address book.

Then, he may automatically address (55) the new message and complete (56) the message.

SUMMARY

Methods for enhancing standard e-mail and electronic message readers and composers have been disclosed to allow realization of enhanced e-mail and electronic message readers and composers which provide automatic addressing and address book management functions for chain-forwarded messages. Certain details of the preferred embodiments have been disclosed, along with alternative approaches to realize the invention. It will be recognized by those skilled in the art that many alternatives from the disclosed preferred embodiment, such as the use of alternate programming methodologies or languages, alternate computing platforms, or alternate electronic message and e-mail standards, may be taken within the spirit and scope of the invention which is defined by the following claims.

What is claimed is:

1. A method for creating and managing chain groups related to chained electronic mail messages in an electronic mail system, said method comprising the steps of:
    receiving or opening a single chained electronic mail message containing a plurality of portions of content, said portions of content being repeated from previous chain senders of said electronic mail message and being stored inline within a body section of said single mail message or being attached to said mail message;
    searching within said single chained electronic mail message for a chain-key field and message chain-key value; and
    associating said searched chained electronic mail message with a chain group which has a chain group chain-key value corresponding to said message chain-key value, said group having one or more other users for whom entries are stored in an electronic address book.

2. The method as set forth in claim 1 wherein said step of searching a chained electronic mail message comprises searching a Simple Mail Transfer Protocol e-mail message.

3. The method as set forth in claim 1 further comprising the step of creating a new chain group with a group chain-key value corresponding to said message chain-key value.

4. The method as set forth in claim 3 wherein said step of creating a new chain group comprises associating a subject descriptor with the new chain group.

5. The method as set forth in claim 3 wherein said step of creating a new chain group comprises associating at least one electronic mail address with the new chain group.

6. A computer-readable media containing computer program code for creating and managing chain groups related to chained electronic mail messages in an electronic mail computer system, said program code when executed causing the electronic mail computer system to perform the steps of:
    receiving or opening a single chained electronic mail message containing a plurality of portions of content, said portions of content being repeated from previous chain senders of said electronic mail message and being stored inline within a body section of said single mail message or being attached to said mail message;
    searching within said single chained electronic mail message for a chain-key field and message chain-key value; and
    associating said searched chained electronic mail message with a chain group which has a chain group chain-key value corresponding to said message chain-key value, said group having one or more other users for whom entries are stored in an electronic address book.

7. The computer-readable media as set forth in claim 6 wherein said program code for searching a chained electronic mail message comprises program code for searching a Simple Mail Transfer Protocol e-mail message.

8. The computer-readable media as set forth in claim 6 further comprising program code for creating a new chain group with a group chain-key value corresponding to said message chain-key value.

9. The computer-readable media as set forth in claim 8 wherein said program code for creating a new chain group comprises program code for associating a subject descriptor with the new chain group.

10. The computer-readable media as set forth in claim 8 wherein said program code for creating a new chain group comprises program code for associating at least one electronic mail address with the new chain group.

11. A system for managing chain groups for chained electronic messages in an electronic mail terminal, said electronic mail terminal having a processor suitable for executing program code, and said electronic mail terminal having a means for receiving chained-transmitted electronic messages via a computer network, said system comprising:
    a message receiver for opening a single chained electronic mail message containing a plurality of portions of content, said portions of content being repeated from previous chain senders of said electronic mail message and being stored inline within a body section of said single mail message or being attached to said mail message;
    a chain-key searcher for finding a message chain-key field value within said single chained electronic message; and
    an address book chain group associator for associating the chained electronic message with a chain group having a corresponding group chain-key value, said group having one or more other users for whom entries are stored in an electronic address book.

12. The system as set forth in claim 11 wherein said chain-key searcher is adapted to search Simple Mail Transfer Protocol messages.

13. The system as set forth in claim 11 further comprising a chain group creator for creating a new chain group within an address book, said new chain group having a group chain-key value corresponding to a message chain-key field value.

14. The system as set forth in claim 13 wherein said chain group creator comprises a subject descriptor creator for defining a subject descriptor for a new chain group.

15. The system as set forth in claim 14 wherein said chain group creator comprises a group member associator for associating one or more electronic mail addresses with a new chain group.

* * * * *